(12) United States Patent
Jarrett et al.

(10) Patent No.: US 10,874,164 B1
(45) Date of Patent: Dec. 29, 2020

(54) DYNAMICALLY TINTED DISPLAY VISOR

(71) Applicant: Rockwell Collins, Inc., Cedar Rapids, IA (US)

(72) Inventors: Andrew M. Jarrett, Cedar Rapids, IA (US); Daniel J. Henry, Cedar Rapids, IA (US); Jeffrey E. Crow, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/370,215

(22) Filed: Mar. 29, 2019

(51) Int. Cl.
| *A42B 3/22* | (2006.01) |
| *G02B 27/00* | (2006.01) |
| *G02B 27/01* | (2006.01) |
| *G02F 1/153* | (2006.01) |

(52) U.S. Cl.
CPC .......... *A42B 3/226* (2013.01); *G02B 27/0093* (2013.01); *G02B 27/0172* (2013.01); *G02B 27/0176* (2013.01); *G02F 1/153* (2013.01); *G02B 2027/014* (2013.01); *G02B 2027/0138* (2013.01); *G02B 2027/0178* (2013.01); *G02B 2027/0196* (2013.01)

(58) Field of Classification Search
CPC ..... A42B 3/042; A42B 3/0426; A42B 3/0433; A42B 3/046; A42B 3/06; A42B 3/22; A42B 3/30; A61B 5/0002; A61B 5/01; A61B 5/024; A61B 5/0476; A61B 5/0478; A61B 5/11; A61B 5/14553; A61B 5/6803; G08B 25/016; H04N 5/2252; H04N 5/2253; H04N 5/772; H04N 5/91
See application file for complete search history.

(56) References Cited

U.S. PATENT DOCUMENTS

| 2016/0044276 A1* | 2/2016 | Shearman ............ A42B 3/0426 348/207.1 |
| 2016/0252728 A1* | 9/2016 | MacK ...................... G06F 3/147 351/158 |
| 2017/0242253 A1* | 8/2017 | Benesh .............. G02B 27/0172 |

* cited by examiner

*Primary Examiner* — Nelson M Rosario
(74) *Attorney, Agent, or Firm* — Suiter Swantz pc llo

(57) ABSTRACT

A dynamically tinted display visor (DTDV) is disclosed. In embodiments, the DTDV includes a visor surface having an untinted or substantially transparent setting and a tinted or substantially opaque setting. The visor surface is fixed to a helmet worn by an operator (e.g., a pilot or co-pilot), the helmet further including a head tracking system for monitoring the head pose (e.g., head position and orientation) of the operator. Helmet-mounted cameras include auto-gain sensors capable of assessing ambient light levels consistent with the head pose of the operator. The DTDV includes a tint processor for adjusting the tint setting of the visor surface based on an assessment of the head pose data and sensed ambient light levels, automatically detinting or darkening the visor as conditions demand or manually detinting/darkening at the operator's command.

15 Claims, 6 Drawing Sheets

DYNAMICALLY TINTED DISPLAY VISOR

BACKGROUND

Pilots may be equipped with a helmet-mounted display (HMD) including a display visor extending mostly or fully across the pilot's full field of view (FOV). The display visor provides a surface through which the pilot may view control panels and displays within the aircraft cockpit as well as features (e.g., other aircraft, natural features, manmade structures, as yet unidentified objects, potential hostiles) outside the aircraft. At the same time, synthetic vision systems (SVS), distributed aperture systems (DAS), and other types of enhanced vision systems (EVS) may project visual information onto the interior of the display visor, e.g., symbology or other visual enhancements superimposed on objects viewed through the display visor, or image streams of through-airframe scenery.

Ambient light levels in the cockpit may vary according to a number of different factors, e.g., the time of day (day/night), altitude (above/below cloud cover), heading (facing/obscuring the sun). Conventional approaches to this problem do not adequately address the breadth of brightness levels under which the display visor must perform. For example, traditional helmets employ multiple visors for transparent and dark tint levels, but this approach may increase both the weight and volume of the helmet shell while failing to provide optimal performance at every possible light level (e.g., a dark-tinted visor may be adequate for operations while facing the sun but may inhibit a clear view of displays within the cockpit. Single-visor solutions may photochromically tint the display visor, but cannot be controlled by the pilot.

SUMMARY

A dynamically tinted display visor (DTDV) is disclosed. In embodiments, the DTDV includes a visor surface having at least an untinted or substantially transparent setting and a tinted or substantially opaque setting. The visor surface is fixed to a helmet worn by an aircraft pilot, the helmet further including a head tracking system for monitoring the head pose (e.g., head position and orientation) of the pilot. The helmet includes helmet cameras, the cameras including auto-gain sensors capable of assessing ambient light levels consistent with the head pose. The DTDV includes a tint processor for adjusting the tint setting of the visor surface based on an assessment of the head pose data and sensed ambient light levels, detinting or darkening the visor as conditions demand.

In embodiments, the visor surface is an electrochromic surface.

In embodiments, the head tracker includes eye trackers capable of enhancing the head pose data with gaze data corresponding to the orientation of the pilot's eyes.

In embodiments, the tint processor adjusts the tint setting based on the gaze data in addition to the head pose data and the ambient light levels.

In embodiments, the tint processor adjusts the DTDV between a substantially transparent or detinted setting and a substantially opaque or darkened setting.

In embodiments, the helmet cameras are configured to capture images for display to the pilot via the interior surface of the DTDV.

In embodiments, the DTDV includes a display controller that adjusts the brightness of images (e.g., captured by the helmet cameras or remotely from the pilot) and graphic enhancements (e.g., symbology and other visual elements superimposed on the displayed images) displayed on the visor surface based on adjustments to the tint settings.

In embodiments, the tint processor adjusts the tint settings if images and visual elements are displayed on the interior surface of the DTDV.

A helmet-mounted display (HMD) is also disclosed. In embodiments, the HMD is embodied in a helmet worn by an aircraft pilot. The HMD includes helmet cameras aligned with the pilot's field of view, the helmet cameras including auto-gain sensors capable of determining ambient light levels associated with the field of view. The HMD includes a display visor fixed to the helmet and likewise aligned with the pilot's field of view; the display visor may have one or more tint settings including a substantially transparent setting and a substantially opaque or darkened setting. The HMD includes projectors fixed to the helmet behind the display visor, the projectors connected with an enhanced vision system and capable of projecting visual intelligence onto an interior surface of the display visor. The HMD includes a head tracker fixed to the helmet and capable of generating head pose data based on the current position and orientation of the pilot's head. The HMD includes tint processors capable of automatically adjusting the tint setting of the display visor based on changes in the head pose data or the ambient light levels.

In embodiments, the visor surface is an electrochromic surface.

In embodiments, the head tracker includes eye trackers configured to generate gaze data based on the orientation of the pilot's eyes.

In embodiments, the tint processor electronically adjusts the tint setting based on the gaze data in addition to (or instead of) the head pose data and ambient light levels.

In embodiments, the HMD includes a tint controller connected to the tint processor, the tint controller capable of allowing the pilot to manually adjust the tint setting.

In embodiments, the tint processor adjusts the tint setting between a substantially transparent setting and a substantially opaque or darkened setting.

In embodiments, the visual intelligence includes imagery captured by the helmet cameras or other cameras external to the cockpit, or graphics and symbology superimposed on displayed images.

In embodiments, the tint processor adjusts the tint setting based on whether visual intelligence is projected onto the display visor.

In embodiments, the HMD includes a display controller that adjusts the brightness of the projected visual intelligence based on adjustments to the tint settings.

In embodiments, the tint processor is configured to adjust the tint setting based on the projected visual intelligence.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
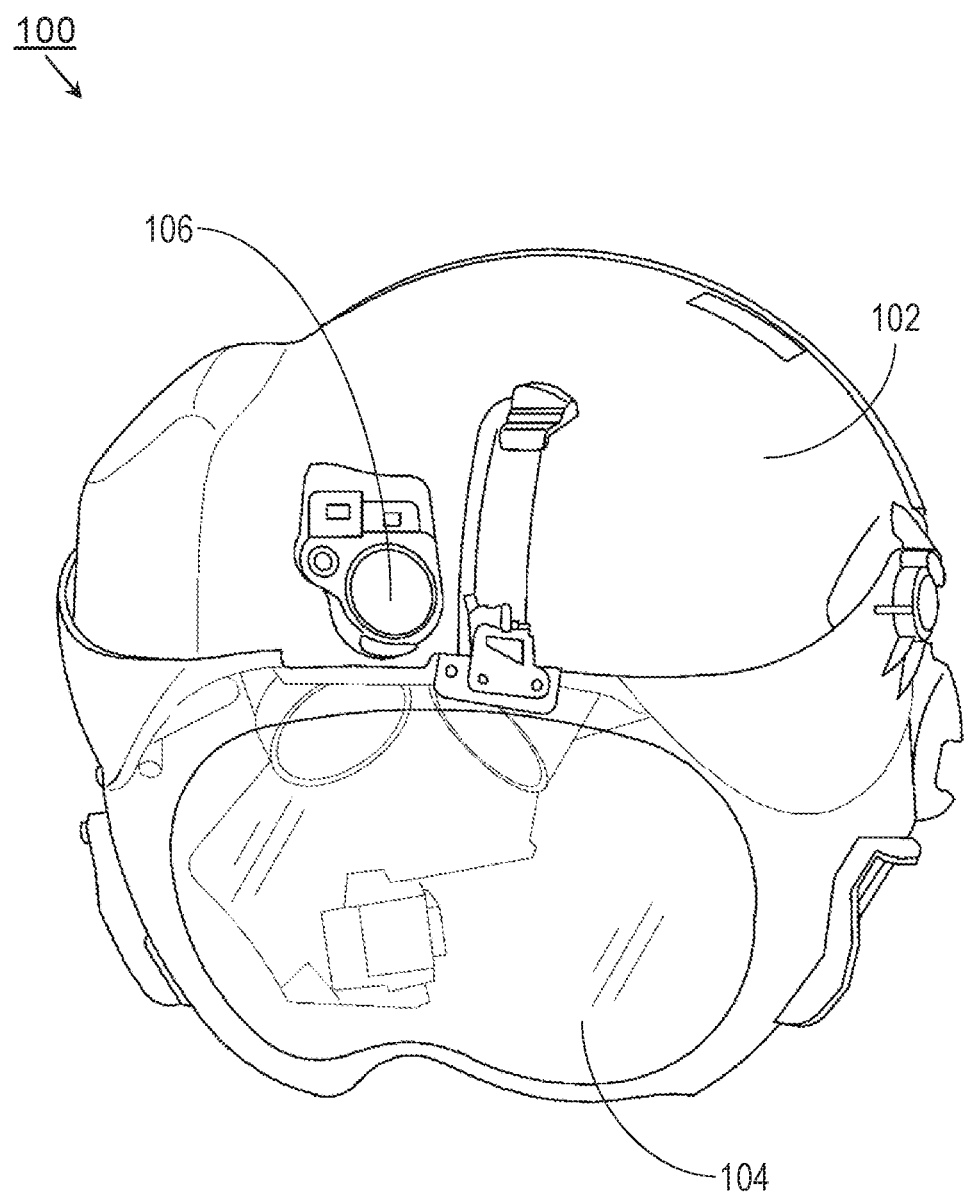
FIG. 1 illustrates a dynamically tinted display visor (DTDV) and helmet-mounted display (HMD) in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A dynamically tinted display visor (DTDV) is disclosed. The DTDV provides automatic transition between an untinted (transparent) setting and a tinted (darkened, opaque) setting for the DTDV operator (e.g., a pilot wearing a helmet-mounted display (HMD) incorporating the DTDV). Based on ambient light sensed by auto-gain sensors in the helmet cameras, or head pose information determined by the HMD head-tracker, the DTDV may automatically darken or detint as conditions demand. In addition, the DTDV provides for manually controlled darkening or detinting at the operator's command.

Referring to FIG. 1, a helmet-mounted display 100 (HMD) is disclosed. The HMD 100 may be embodied in a helmet 102 worn by an operator (e.g., a pilot of a fixed-wing aircraft, helicopter, single-seat, dual-seat, or multi-seat craft) and may include a display visor 104 and one or more cameras 106, e.g., a night vision camera capable of capturing low-visible-light infrared (IR) imagery. For example, the display visor 104 may be substantially transparent, such that the operator may view objects through the visor. For example, the operator may view through the visor the primary flight display (PFD) and/or additional display devices and instrument panels in the aircraft cockpit. The operator may view objects outside the cockpit, or outside the aircraft, through the display visor 104 (e.g., external atmospheric conditions, terrain elements, proximate air traffic).

Under certain conditions, visual intelligence may be displayed on an interior surface of the display visor 104 instead of, or supplemental to, objects or scenery directly visible through the display visor. For example, the HMD 100 may incorporate a head-tracking system to continually determine head pose data corresponding to the precise position and orientation of the operator's head, e.g., relative to the aircraft. Based on this head pose data, the HMD 100 may determine which objects and scenery are currently in the field of view of the display visor 104, and (via an enhanced vision system (EVS), synthetic vision system (SVS), distributed aperture systems (DAS), or combined vision system (CVS) superimpose additional graphic elements or symbology over or proximate to the relative positions of relevant objects as seen through the display visor. For example, if the pilot is currently looking outside the aircraft, the HMD 100 may superimpose terrain data on an interior surface of the display visor 104, the terrain data identifying natural or manmade features in the pilot's field of view. The HMD 100 may, additionally or alternatively, display instrument or flight data (e.g., airspeed, heading, altitude, fuel status) on the interior surface of the display visor 104, so that the pilot may maintain situational awareness even when s/he is not directly looking at the instrument panel. For example, projectors mounted inside the helmet 102 and substantially aligned with the operator's field of view may project visual elements and symbology onto the interior surface of the display visor 104 at an optimal angle or orientation for viewing by the pilot.

Figure 2:
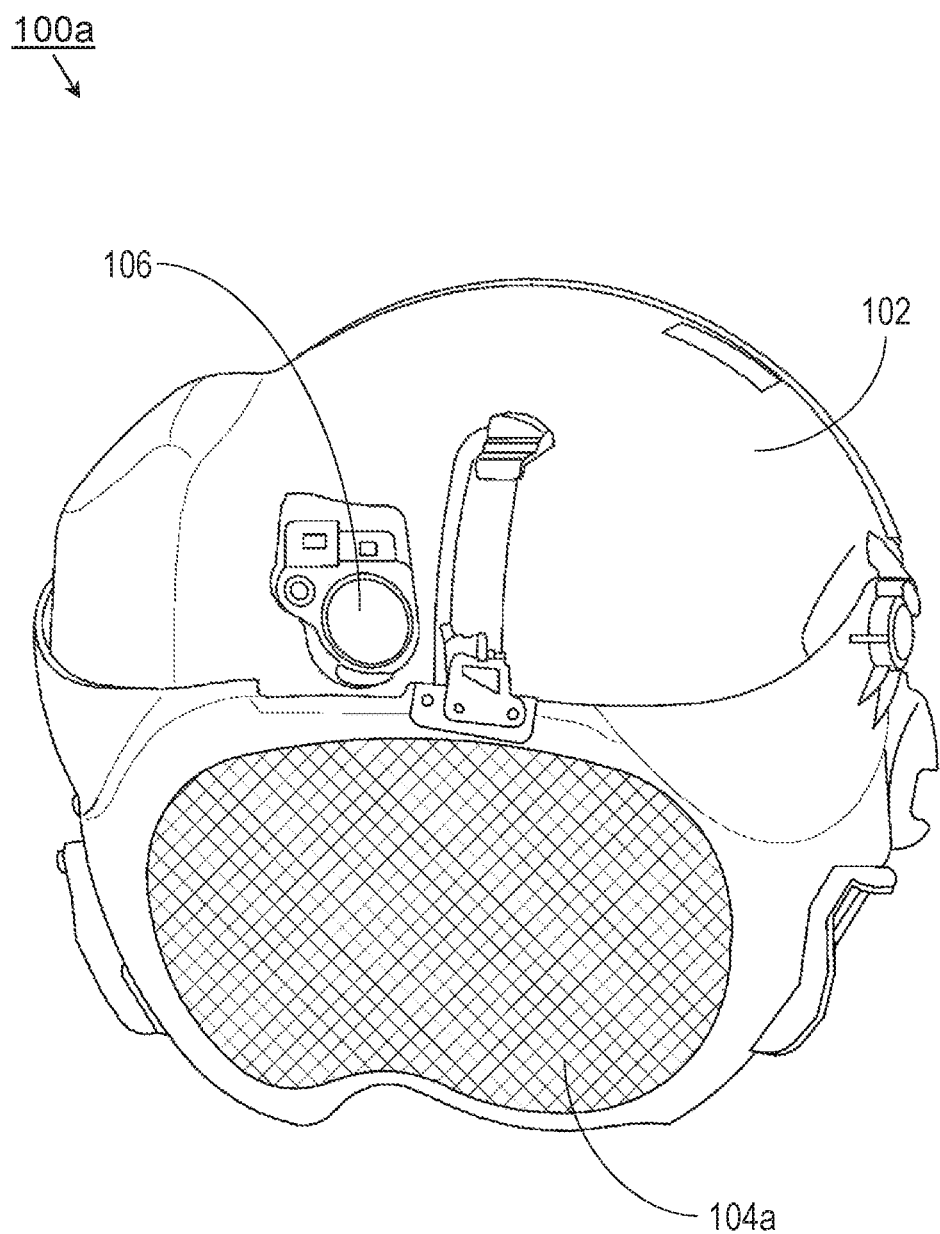
FIG. 2 illustrates the DTDV of FIG. 1 in a darkened state.

Referring to FIG. 2, the HMD 100a may be implemented and may function similarly to the HMD 100 of FIG. 1, except that the HMD 100a may incorporate a dynamically tinted display visor 104a (DTDV) capable of transitioning from a substantially transparent setting (as shown by the HMD 100 of FIG. 1) to a substantially opaque or darkened setting, or vice versa.

As noted above, flight operations may take place at different times of day and at different altitudes (e.g., above or below cloud cover). Even during a routine daytime flight the head pose of the pilot may shift (e.g., the field of view of the DTDV 104a may be toward, away from, or orthogonal to the sun) dozens or hundreds of times. The surface of the DTDV 104a may incorporate an electrochromic surface capable of automatic electronic transition between the transparent state and the opaque state based on the current head pose, based on ambient light levels, or based on a combination of both factors. For example, the helmet camera 106 may include autogain sensors capable of sensing light levels and determining whether signals sent from the camera's image sensors should be amplified (e.g., due to low light levels).

Figure 3:
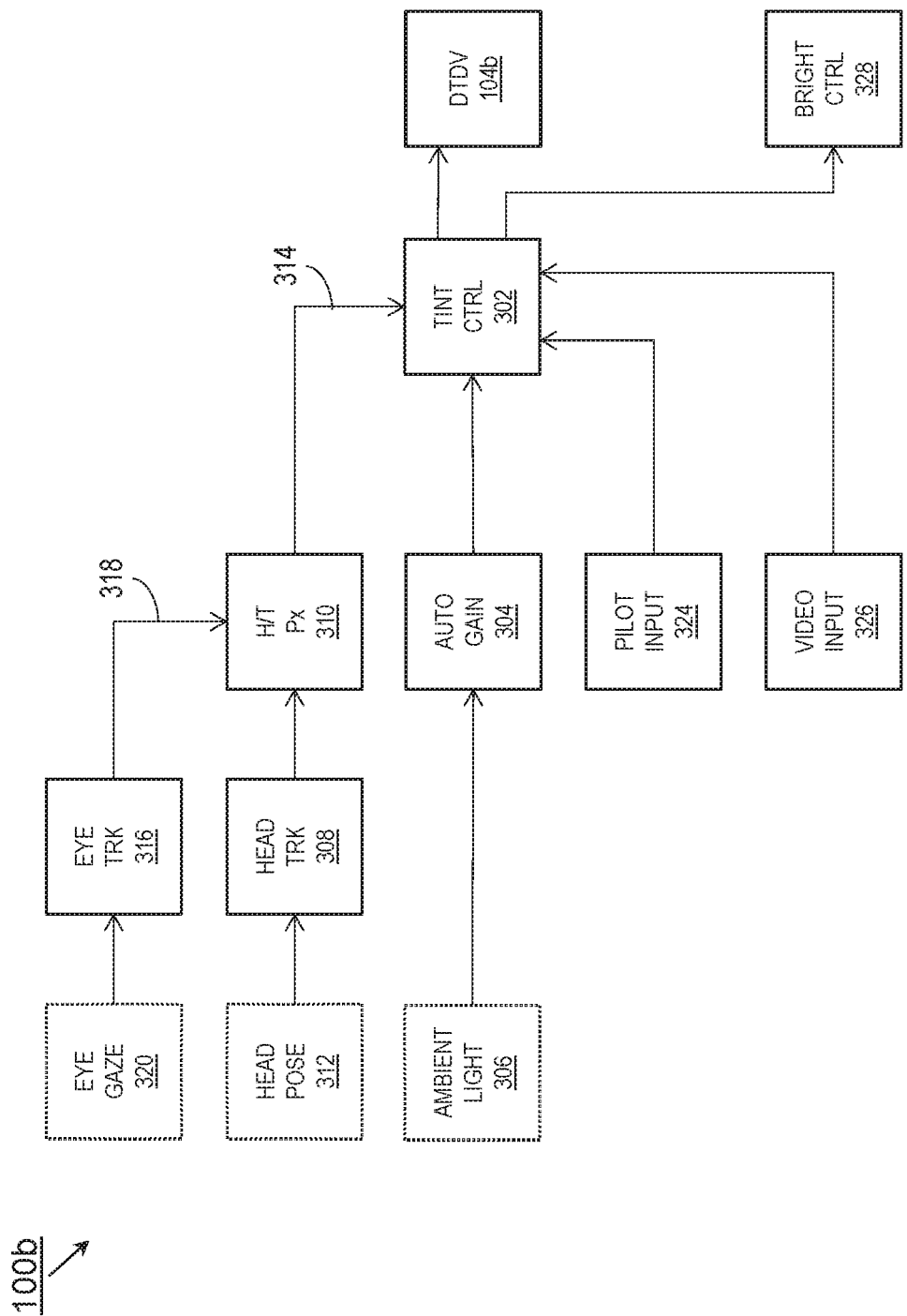
FIG. 3 is a block diagram illustrating operations of the DTDV and HMD of FIG. 1.

Referring now to FIG. 3, the HMD 100b and DTDV 104b may be implemented and may function similarly to the HMD 100a and DTDV 104a of FIG. 2, except that the HMD 100b may incorporate a tint processor 302 (tint controller) for managing automatic transition of the DTDV 104b between the transparent state and the opaque state. For example, the autogain sensors 304 of the helmet camera (106, FIG. 1) may continually assess ambient light levels (306) while the head tracker 308 and head tracking processors 310 continually evaluate the head pose 312 of the helmet (102, FIG. 1; e.g., the head of the pilot) relative to the aircraft (e.g., the head tracking processors may correlate inertial position data from the head tracker 308 with absolute or satellite navigation-based aircraft position data). Based on the head pose data (314) determined by the head tracking processor 310 and the ambient light levels 306 detected by the autogain sensors 304, the tint processor 302 may automatically transition the DTDV 104b between the transparent and opaque states (e.g., by directing that a voltage be applied to the electrochromic surface of the DTDV).

In some embodiments, the head tracker 308 includes one or more eye trackers 316 capable of generating gaze data 318 based on the orientation 320 (e.g., gaze) of the eyes of the operator. Gaze data 318 may correspond to the orientation of the eyes relative to the aircraft, or relative to the head pose. For example, if the operator's head is oriented toward the primary flight display (PFD) within the cockpit but the operator is briefly relying on peripheral vision to view an object outside the aircraft, the eye orientation 320 and head pose 312 may not match precisely. The head pose data 314 determined by the head tracking processor 310 and evaluated by the tint processor 302 may thus account for the gaze data 318.

In some embodiments, the operator may manually direct (324) the tint processor 302 to transition the DTDV 104b, e.g., via a tint controller in communication with the tint processor. Further, the tint processor 302 may automatically transition the DTDV 104b based on whether video or image streams (326) are being projected onto the DTDV. For example, if a distributed aperture system (DAS) is providing through-airframe views of objects beneath the aircraft (e.g., captured by IR imaging sensors on the aircraft exterior), the tint processor 302 may auto-darken the DTDV 104b to obscure objects otherwise directly viewable through the DTDV. The uniform tinting of the DTDV 104b may help to increase contrast, reduce parallax (and pilot disorientation associated therewith), and enhance the pilot's ability to distinguish detail within the through-airframe views. Further, the tint processor 302 may respond to an automatic or manual transition of the DTDV 104b (e.g., from the transparent to the opaque state) by directing graphics generators (e.g., EVS, SVS, DAS, CVS) to reduce the brightness (328) of visual intelligence (e.g., imagery, graphics, symbology) projected onto the DTDV.

Figure 4A:
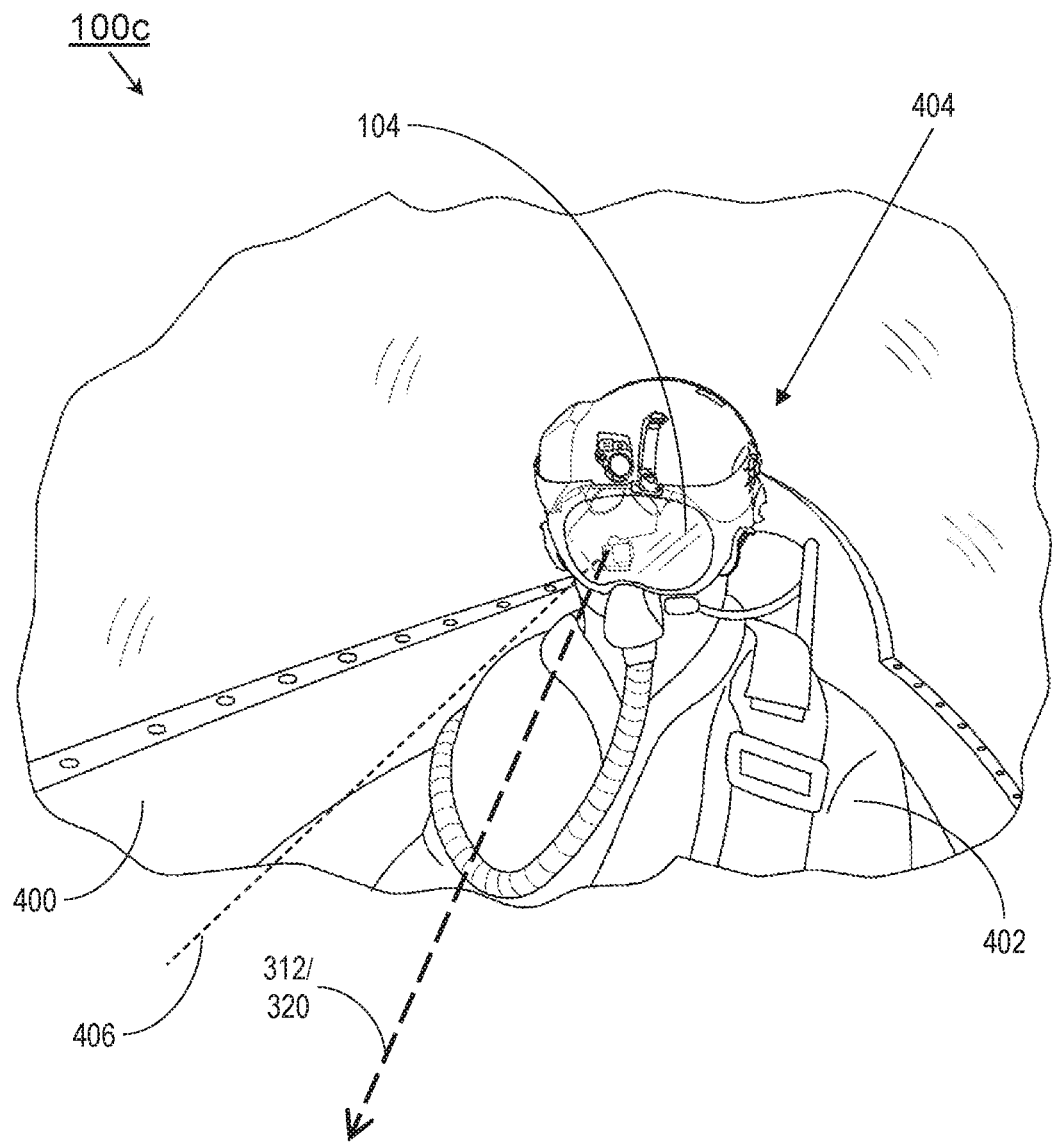
FIGS. 4A through 4C are illustrations of the DTDV and HMD of FIG. 1.

Referring now to FIG. 4A, the HMD 100c may be implemented and may function similarly to the HMD 100b of FIG. 3, except that the HMD 100c may be deployed within an aircraft 400 operated by a pilot 402. For example, the head tracker (308, FIG. 3) may determine that the head 404 of the pilot 402 is oriented (head pose 312) in a generally forward direction relative to the aircraft 400 and slightly downward (e.g., below the horizontal 406), indicating that the gaze 320 of the pilot is likely directed toward the primary flight display (PFD) or toward other display units and instrument panels situated at the front of the aircraft cockpit. Similarly, the autogain sensors (304, FIG. 3) of the helmet camera 106 may indicate low to moderate ambient light levels consistent with a head pose 312/gaze 320 directed toward the cockpit. The tint processor (302, FIG. 3) may transition the DTDV 104 to the transparent state to optimize the ability of the pilot 402 to directly view the PFD and other cockpit displays and panels through the DTDV.

Figure 4B:
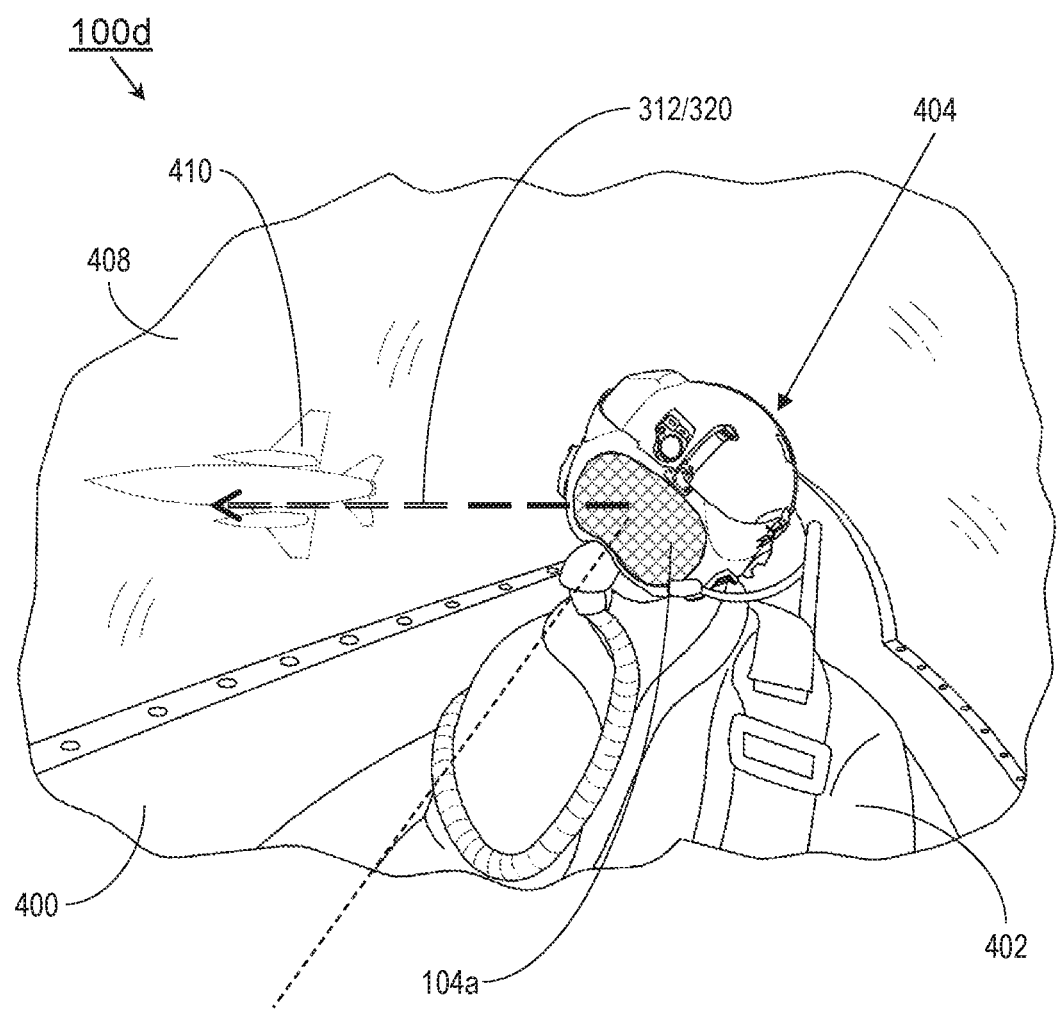

Referring now to FIG. 4B, the HMD 100d may be implemented and may function similarly to the HMD 100c of FIG. 4A, except that with respect to the HMD 100d, the pilot 402 may direct his/her head pose 312/gaze 320 through the cockpit window 408 and toward a proximate aircraft 410 or other object external to the aircraft 400. Similarly, the autogain sensors (304, FIG. 3) may indicate high ambient light levels, e.g., consistent with a head pose 312/gaze 320 either external to the aircraft 400, during the daytime, oriented generally toward the sun, or some combination thereof. The tint processor (302, FIG. 3) may respond by transitioning the DTDV to the opaque state (104a) to reduce glare.

Figure 4C:
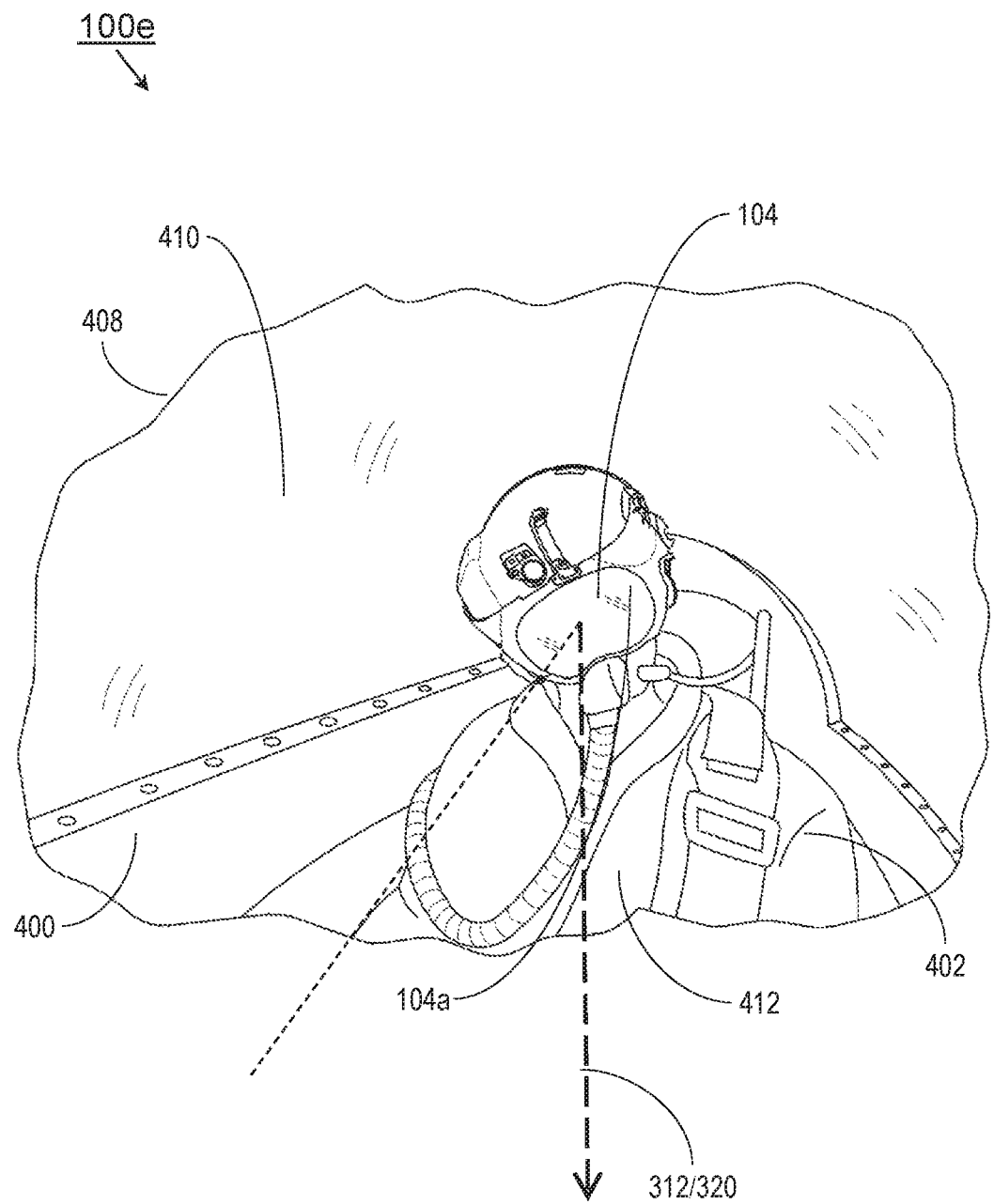

Referring now to FIG. 4C, the HMD 100e may be implemented and may function similarly to the HMD 100d of FIG. 4B, except that with respect to the HMD 100e, the pilot 402 may direct his/her head pose 312/gaze 320 downward, consistent with viewing through-airframe scenery generated by an onboard DAS (e.g., infrared imagery of scenery and objects positioned below the aircraft 400, which the pilot 402 would not otherwise be able to see). Similarly, the autogain sensors (304, FIG. 3) may indicate low light levels consistent with a head pose 312/gaze 320 directed into the cockpit, and away from the (potentially brightly lit) atmosphere external to the aircraft 400. The tint processor (302, FIG. 3) may respond by transitioning the DTDV 104 to the opaque state to obscure objects otherwise directly visible in the field of view of the pilot 402 (e.g., the pilot's flightsuit 412 or cockpit components) so that the pilot may clearly view through-airframe imagery consistent with the pilot's current head pose 312/gaze 320.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A dynamically tinted display visor, comprising:
a visor surface having at least one tint setting, the visor surface fixed to a helmet worn by an operator;
a head tracker fixed to the helmet and configured to generate head pose data corresponding to the operator;
at least one eye tracker configured to generate gaze data associated with an eye of the operator;
an auto-gain sensor fixed to the helmet and aligned with the visor surface, the auto-gain sensor configured to determine a light level;
and
a tint processor operatively coupled to the head tracker and the auto-gain sensor and electronically coupled to the visor surface, the tint processor configured to electronically adjust the tint setting based on at least one of the head pose data, the gaze data, and the determined light level.

2. The dynamically tinted display visor of claim 1, wherein the visor surface is an electrochromic surface.

3. The dynamically tinted display visor of claim 1, further comprising:
a tint controller configured to receive control input from the operator, the tint controller operatively coupled to the tint processor, the tint processor configured to electronically adjust the tint setting based on the received control input.

4. The dynamically tinted display visor of claim 1, wherein the tint processor is configured to adjust the tint setting between a substantially transparent setting and a substantially opaque setting.

5. The dynamically tinted display visor of claim 1, wherein the auto-gain sensor is embodied in a camera configured to capture at least one image for display on the visor surface.

6. The dynamically tinted display visor of claim 5, wherein the at least one image is a first image, further comprising:
at least one display controller communicatively coupled to the tint processor, the display controller configured to adjust, based on the adjusted tint setting, a brightness setting corresponding to at least one visual element displayed on the visor surface, the visual element including at least one of:
the at least one first image;
at least one second image captured remotely from the dynamically tinted display visor;
and
a graphic element superimposed on at least one of the first image and the second image.

7. The dynamically tinted display visor of claim 5, wherein the tint processor is configured to adjust the tint setting based on the at least one visual element.

8. A helmet-mounted display (HMD), comprising:
a helmet worn by an operator;
at least one helmet camera fixed to the helmet and aligned with a field of view of the operator, the helmet camera including at least one auto-gain sensor configured to determine a light level;
a display visor fixed to the helmet and aligned with the field of view, the display visor associated with at least one tint setting;
at least one projector fixed to the helmet and communicatively coupled with an enhanced vision system of an aircraft, the projector configured to:
receive visual intelligence generated by at least one of the helmet camera and the enhanced vision system; and
project the visual intelligence onto an interior surface of the display visor;
a head tracker fixed to the helmet and configured to generate head pose data corresponding to the operator;
at least one tint processor operatively coupled to the head tracker and to the auto-gain sensor and electronically coupled to the display visor, the tint processor configured to electronically adjust the tint setting based on at least one of the head pose data and the determined light level.

9. The HMD of claim 8, wherein the visor surface is an electrochromic surface.

10. The HMD of claim 8, wherein:
the head tracker includes at least one eye tracker configured to generate gaze data associated with an eye of the operator;
and
the tint processor is configured to electronically adjust the tint setting based on at least one of the gaze data, the head pose data, and the determined light level.

11. The HMD of claim 8, further comprising:
a tint controller configured to receive control input from the operator, the tint controller operatively coupled to the tint processor, the tint processor configured to electronically adjust the tint setting based on the received control input.

12. The HMD of claim 8, wherein the tint processor is configured to adjust the tint setting between a substantially transparent setting and a substantially opaque setting.

13. The HMD of claim 8, wherein the visual intelligence includes at least one of:
a first image captured by the helmet camera;
a second image captured remotely from the HMD;
and
a graphic element superimposed on at least one of the first image and the second image.

14. The HMD of claim 13, further comprising:
at least one display controller communicatively coupled to the tint processor, the display controller configured to adjust, based on the adjusted tint setting, a brightness setting corresponding to the projected visual intelligence.

15. The HMD of claim 8, wherein the tint processor is configured to adjust the tint setting based on the projected visual intelligence.

* * * * *